(12) United States Patent
Lordi

(10) Patent No.: US 6,673,465 B2
(45) Date of Patent: Jan. 6, 2004

(54) PAPER/PLASTIC LAMINATE AND METHOD FOR MAKING SAME

(76) Inventor: James Lordi, 39 Carriage Dr., Cheshire, CT (US) 06410

(*) Notice: Subject to any disclaimer, the term of this patent is extended or adjusted under 35 U.S.C. 154(b) by 0 days.

(21) Appl. No.: 09/867,293

(22) Filed: May 29, 2001

(65) Prior Publication Data

US 2002/0182430 A1 Dec. 5, 2002

(51) Int. Cl.$^7$ .............................................. B32B 29/00
(52) U.S. Cl. ................... 428/537.5; 428/511; 428/34.2; 428/34.3; 428/195; 427/207.1; 427/208.8; 427/156; 427/325; 427/327
(58) Field of Search .............................. 428/511, 537.5, 428/34.2, 34.3, 195; 156/325, 327; 427/207.1, 208.8

(56) References Cited

U.S. PATENT DOCUMENTS

| | | | |
|---|---|---|---|
| 5,244,702 A | * 9/1993 | Finestone | 428/34.3 |
| 5,830,548 A | * 11/1998 | Andersen | 428/36.4 |
| 5,918,099 A | * 6/1999 | Schlueter | 399/333 |
| 6,118,968 A | * 9/2000 | Schlueter | 399/333 |
| 6,336,026 B1 | * 1/2002 | Heeks | 399/302 |

OTHER PUBLICATIONS

NOVAFLEX article entitled "Solventless Laminating: The Future of Coating and Laminating is Here", May 2003.
Resene Engineered Coating Systems Online article entitled "Cost Considerations", Feb. 1999.
CHEMCO Systems article entitled "Coating Guide", May 2003.
National Technology Transfer Cetner abstract entitled "Solventless Adhesive Systems", Sep. 1999.
The Somay Paint Factory article entitled "Polibrid Coatings, Inc.", May 2003.
Label and Tag Manufacturers Association of Australia alphabetized index from Q–S, May 2003.
The Guardian Resin Corporation Technical Data Sheet entitled "GRC 63".
Peter A Voss entitled "Water–Based Adhesives Solventless Lamination Reduces Flexible Packaging Vocs", Feb. 2002.

* cited by examiner

Primary Examiner—Leszek Kiliman
(74) Attorney, Agent, or Firm—McCormick, Paulding & Huber LLP

(57) ABSTRACT

The invention is a paper/plastic laminate suitable for use in office, midrange and high-speed traditional laser and digital copiers and digital printers, and other like equipment using heat set fuser toner adhesion as the method for fusing/bonding an ink to a paper. The paper/plastic laminate comprises a paper web laminated to a plastic film using 100% solids adhesives. Employing 100% solids adhesive technology in the laminating process yields a more dimensionally stable paper/plastic laminate when the laminate is re-exposed to heat and the ability to make lighter paper/plastic laminates than otherwise possible using solvated or waterborne adhesives.

19 Claims, 1 Drawing Sheet

PAPER/PLASTIC LAMINATE AND METHOD FOR MAKING SAME

FIELD OF THE INVENTION

The present invention is generally directed to paper. More particularly the invention is a paper/plastic laminate that can withstand elevated temperatures such as are encountered in office, midrange and high-speed traditional laser and digital copiers and digital printers, and other like equipment using heat set fuser toner adhesion as the method for fusing/bonding an ink to a paper.

BACKGROUND OF THE INVENTION

Durable papers are designed to perform in environments unfriendly to regular papers, such as the generally available 100 percent fiber papers. There are four basic categories of durable papers: papers that are bulkier or in some other way stronger; papers that have been surface treated; synthetic papers; and paper/plastic laminates.

Generally, paper/plastic laminates are composed of a paper web affixed to a plastic film and have tear characteristics comparable to synthetic papers and surface characteristics comparable to regular paper. Beyond the tear resistance of paper/plastic laminates, the paper web can be manipulated by well known methods to give the paper surface characteristics suitable for a broad range of applications such as fine writing papers, maps or archival documents. Current paper/plastic laminates, however, suffer from an inability to be used effectively with office, midrange and high-speed traditional laser and digital copiers and digital printers, and other like equipment using heat set fuser toner adhesion as the method for fusing/bonding an ink to a paper. Current paper/plastic laminates do not work well with this equipment as the equipment employs processes during normal operation that reach temperatures at which the paper/plastic laminate loses dimensional stability, which is manifested in wrinkling and curling of the paper/plastic laminate.

The dimensional instability of current paper/plastic laminates results from the laminating method employed to bind the paper web to the plastic film. Many current laminating processes employ fluids, water or solvent, that must be removed from the laminated product by heating. This heating alters the characteristics of the laminate, paper web and/or plastic film, leading to the dimensional instability when the conventional equipment reheats the paper/plastic laminate. The heating process also complicates and adds cost to the manufacturing process, due to the need for additional equipment such as ovens and pollution controls, and the increased time required for manufacture.

A further problem associated with the use of fluids in manufacturing paper/plastic laminates is the limitations on the overall basis weight of the paper web. The paper web must have sufficient strength to be capable of being processed while wet. The basis weight and caliper of the paper web is, therefore, increased to assure an appropriate paper web wet strength. This leads to paper/plastic laminates that have a caliper, thus weight, greater than would otherwise have been required if fluids were not used.

It would be beneficial if a paper/plastic laminate could be developed that is compatible with office, midrange and high-speed traditional laser and digital copiers and digital printers, and other like equipment using heat set fuser toner adhesion as the method for fusing/bonding an ink to a paper. In other words, a paper/plastic laminate that is more substitutable for regular papers than current paper/plastic laminates. It would also be beneficial if the manufacturing costs and times associated with paper/plastic laminates could be reduced.

SUMMARY OF THE INVENTION

The invention is a paper/plastic laminate with a paper web laminated to a plastic film using a 100 percent solids adhesive that remains dimensionally stable in equipment employing heat set fuser toner adhesion as the method for fusing/binding the ink to the paper. A 100 percent solids adhesive as used herein means an adhesive employing 100% Solids Adhesives technology as differentiated from solvated adhesives and waterborne adhesives. Depending upon the desired application for the paper/plastic laminate, the paper web and the plastic film can have a range of characteristics. In one embodiment, a second paper web is laminated to the other side of the plastic film, sandwiching the plastic film between two paper webs.

The paper/plastic laminate is designed to be a durable paper that can be used similarly to regular paper in office, midrange and high-speed traditional laser and digital copiers and digital printers, and other like equipment using heat set fuser toner adhesion as the method for fusing/bonding an ink to a paper. The paper/plastic laminate of the present invention has an appearance and a texture consistent with regular papers. The plastic film layer, however, gives the paper/plastic laminate an extraordinary resistance against tearing.

The paper web has a top surface that permits writing or printing to be placed thereon using conventional writing implements, printing equipment and inks, and it is adapted to permit the paper/plastic laminate to be used with the equipment identified above. The characteristics of the paper web can be tailored, similarly to regular paper, to the application by any of a number of conventional processes well known to those skilled in the art of papermaking. Characteristics commonly adjusted are dimensional stability in the presence of heat, opacity, brightness, pH, water resistance, and acid content. The paper web, however, must be formulated to be compatible with the plastic film and the laminating process discussed below. In the laminating process an adhesive is applied between the paper web and the plastic film; therefore, the paper web must be formulated to avoid such problems as adhesive penetration and holdout.

The plastic film can be of any material to which the paper web can be adhered. The most common plastic film materials are polyester and polypropylene. The plastic film material is selected not only for its ability to be adhered to the paper web, but also for its dimensional stability, both shrinkage and distortion, in the presence of heat. The processes used in the conventional equipment mentioned above can generate significant heat, up to at least 375 degrees F. This heat is sufficient to curl and/or to shrink current paper/plastic laminates. Therefore, the plastic film is selected not only for its strength, but also for its thermal characteristics.

The laminating process positions an adhesive between the paper and the plastic film and then laminates, compresses, the paper to the plastic film. The adhesive is a 100% solids adhesive.

The resulting paper/plastic laminate is dimensionally stable allowing for traditional imaging applications and processing of all forms of printing, heat set toner fusing, ink-jet printing and high-speed paper converting. Dimensionally stable meaning that the paper/plastic laminate remains essentially flat, no curl or stretch, when passed through conventional paper utilizing machines using heat set fuser toner adhesion, for example copiers such as a Docutech 6180 by Xerox and Heidelberg 9110 Digimaster, digital printers and laser printers wherein fusing temperatures are greater than about 375 degrees F.

DETAILED DESCRIPTION

Figure 1:
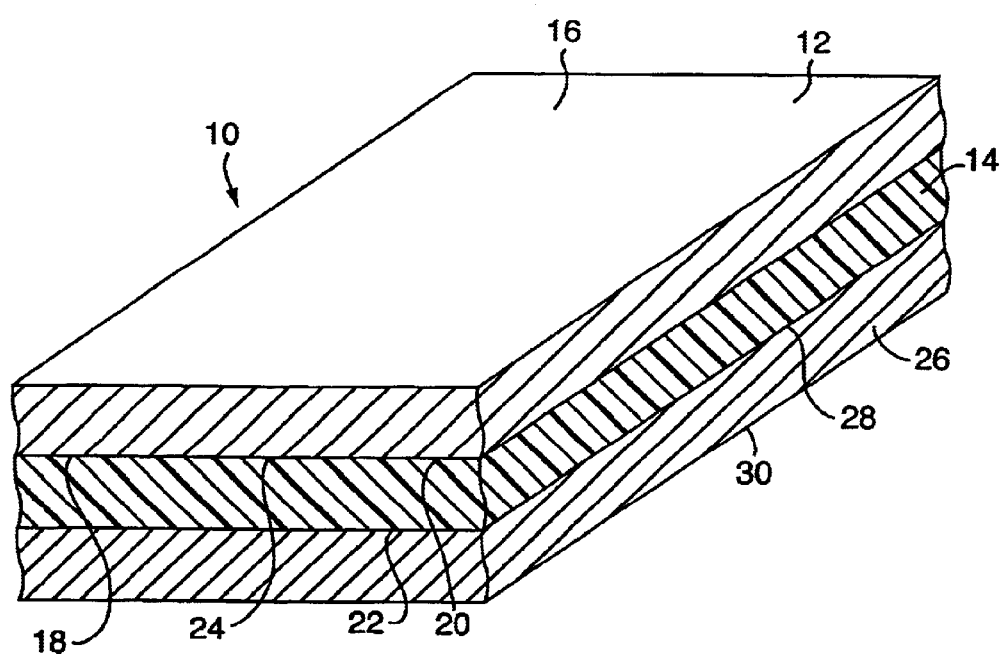
FIG. 1 is an enlarged perspective view of the paper/plastic laminate of the present invention.

As shown in FIG. 1 a paper/plastic laminate embodying the present invention, generally referred to by the reference number 10, comprises a paper web 12 and a plastic film 14. The paper web 12 has a top surface 16 and a bottom surface 18. The plastic film 14 has a top surface 20 and a bottom surface 22. The bottom surface 18 of the paper web 12 is secured to the top surface 20 of the plastic film 14 by an adhesive layer 24. In this embodiment, a second paper web 26 having a top surface 28 and a bottom surface 30 has the top surface 28 adhered to the bottom surface 22 of the plastic film 14.

The paper web 12 is designed to have suitable characteristics for application in office, midrange and high-speed traditional laser and digital copiers and digital printers, and other like equipment using heat set fuser toner adhesion as the method for fusing/bonding an ink to a paper. A paper web ideally suited for these applications will be one that can withstand the temperature extremes of the process while maintaining its dimensional properties.

The paper web 12 is comprised of a fibrous web formulated with a blend of softwood Kraft, hardwood Kraft and/or recycled fiber. Brightness is a function of the application. A GE brightness value in excess of 83, per TAPPI test method T 452 om-92, is preferred for general writing paper. In premium writing paper, the GE brightness should be around 95, or higher. Conventional optical brightening additives can be used to achieve the desired level of brightness. As those skilled in the art of papermaking will appreciate, selection of the components of the fibrous web affects the brightness of the paper.

The filler content in the paper web must be suitable to provide the opacity desired. For general paper applications, an opacity of at least about 77 percent is suitable, but a minimum opacity of 79 percent is desired. Caliper of the paper web is determined by the application of the paper/plastic laminate and the laminating equipment.

In certain applications water resistance as well as wet strength may be desired. Water resistance can be achieved by use of a conventional internal sizing additive. A conventional wet strength additive may also be incorporated to increase wet rub resistance. Sizing methods and the amount of sizing, as well as wet strength additives are well understood in the art.

To be used in office, midrange and high-speed traditional laser and digital copiers and digital printers, and other like equipment using heat set fuser toner adhesion as the method for fusing/bonding an ink to a paper, the paper must have an electrostatic level of between approximately $10^9$–$10^{12}$ SER (Surface Electrical Resistivity). This level of SER can be achieved by surface treating the top surface 16, 30 with a metal salt such as sodium salt and more specifically sodium nitrate or sodium chloride. The in present invention the paper web was treated with sodium nitrate at the rate of 50 pounds per 1000 pounds of starch, a rate approximately 30 percent greater than typical treatments for standard xerographic paper.

The paper web must be formulated to maintain dimensional stability in the extreme operating temperatures found in heat set fuser toner adhesion. To control curl and shrinkage, it is important that the overall moisture content of the paper web be in the range of about 4 to 5 percent. The paper web must also be resistant to adhesive penetration and allow sufficient holdout (the laminating adhesive is discussed below). Adhesive penetration and holdout should be balanced to allow maximum surface contact, or wetting out. A sufficient level of surface sizing or coating applied through any of several conventional techniques, can be used to prevent the adhesive from penetrating the paper web. Conventional sizing or coatings can be used such as starch, PVA or Latex. AKD (Alkyl Ketene Dimer) sizing in combination with starch sizing has been found to provide suitable adhesion penetration and holdout for a non-acid paper web.

The plastic film can be of any material; however common materials for this application are polyester or polypropylene. The key factors in plastic film material selection are dimensional stability, low shrinkage, balance, ability to adhere to the paper web, and heat resistance. Plastic film properties generally vary by material gauge. Present plastic films employed in the manufacture of paper/plastic laminates of 27-lb. (500 sheets, 17 inch by 22 inch sheets) have gauges of about 118 (approx. 30 micron).

In general, the plastic film should have a mechanical strength exceeding about 29,000 psi, approximately 20.4 Kg/mm$^2$, in all directions measured using ASTM D 882. Thermal heat shrinkage should be less than about 2 percent using the SKC Method (this is an internal measurement of SKC, Inc. of Covington, Ga.), 150 degrees C. for 30 minutes.

The laminating process uses a 100 percent solids adhesive. The laminating process produces a destructive bond between the paper web and the plastic film. A destructive bond is defined as a bond between the paper web and the plastic film that after curing under a T Peel Adhesion Test will not allow the paper web to be separated from the plastic film with the paper web remaining intact.

The 100% Solids Adhesive used in the present invention is a low temperature (flowable at room temperature at about 100 degrees F.) two-component adhesive or a warm (gel at room temperature that is heated to permit the adhesive to flow) one-component adhesive. The selection of adhesive is based on the adhesive penetration and holdout characteristics of the paper web. Generally, the warm temperature adhesive is used where the adhesive penetration and the holdout of the paper web is a concern. The low temperature adhesive is used when adhesive penetration and holdout of the paper web are less of an issue. Each adhesive properly used should produce the desired destructive bond.

Lamination is accomplished using standard lamination techniques. The adhesive can be applied directly to the paper web and/or the plastic film prior to lamination. While the adhesive might be heated to enhance its flow characteristics, the paper web and the plastic film are not heated, except incidentally by contact with the warmed adhesive, if any. The adhesive cures without the addition of heat. Where a second paper web is to be laminated to the other side of the plastic film, some curing time for the first bond should be allowed for.

EXAMPLE 1

A 27-lb. paper/plastic laminate meeting the requirements of the present invention can be made as follows. Obtain 32 GSM SUPERWHITE Laminating Base from ESLEECK of Turners Falls, Mass. Obtain 118 gauge plastic film designated SR50 Skyrol® Polyester from SKC, Inc. of Covington, Ga. The paper web is then laminated to the plastic film by process L1230 of Chase & Sons of Randolph, Mass. The specification of the process will specify the 100% Solids Adhesive, and its method of application to the paper web and/or plastic film.

Although the present invention has been described in considerable detail with reference to certain preferred versions thereof, other versions are possible. Therefore, the spirit and scope should not be limited to the description of the preferred versions contained herein.

What is claimed is:

1. A paper/plastic laminate comprising:
   a paper web having a top and bottom surface,
   a plastic film having a top surface and a bottom surface, the top surface of the plastic film being adhered by a 100 percent solids adhesive to the bottom surface of the paper web forming a paper/plastic laminate, the paper/plastic laminate being dimensionally stable, and
   wherein the paper web is treated to inhibit penetration of the 100 percent solids adhesive.

2. The paper/plastic laminate of claim 1 wherein the paper web is treated with a metal salt at the rate of about 50 pounds per 1000 pounds of starch or more.

3. The paper/plastic laminate of claim 2 wherein the metal salt is sodium nitrate.

4. The paper/plastic laminate of claim 2 wherein the metal salt is sodium chloride.

5. The paper/plastic laminate of claim 1 wherein the plastic film has a thermal heat shrinkage of less than about 2.0 percent.

6. The paper/plastic laminate of claim 1 wherein the plastic film has a mechanical tensile strength greater than about 29,000 psi.

7. The paper/plastic laminate of claim 1 wherein the printable paper sheet has an opacity greater than about 77 percent.

8. The paper/plastic laminate of claim 1 further comprising optical brightening agents sufficient to give an overall brightness greater than about 83 GE brightness.

9. The paper/plastic laminate of claim 1 further comprising a sizing agent positioned within the paper top surface.

10. The paper/plastic laminate of claim 1 wherein the paper has a surface treatment creating an electrostatic level greater than $10^9$ SER.

11. The paper/plastic laminate of claim 10 wherein the electrostatic level is less than about $10^{12}$ SER.

12. The paper/plastic laminate of claim 11 wherein the surface treatment comprises a sodium compound.

13. The paper/plastic laminate of claim 12 wherein the surface treatment comprises sodium nitrate.

14. The paper/plastic laminate of claim 12 wherein the surface treatment comprises sodium chloride.

15. The paper/plastic laminate of claim 1 wherein the paper has an overall moisture content less than about 5 percent.

16. The paper/plastic laminate of claim 15 wherein the paper has an overall moisture content between about 4 and 5 percent.

17. The paper/plastic laminate of claim 1 further comprising a second paper web having a top surface and laminating the second web top surface to the plastic film bottom surface using a 100 percent solids adhesive.

18. The method of making a dimensionally stable paper/plastic laminate comprising:
    selecting a paper web having a bottom surface,
    selecting a plastic film having a top surface,
    laminating the paper web bottom surface to the plastic film top surface using a 100 percent solids adhesive, the paper web, plastic film and 100 percent solids adhesive being selected such that the laminated combination is dimensionally stable, and
    wherein the paper web is treated to inhibit penetration of the 100 percent solids adhesive.

19. The paper/plastic laminate of claim 1 further comprising a second paper web having a top surface laminated to the plastic film using an adhesive.

* * * * *